(12) United States Patent
Beecroft et al.

(10) Patent No.: US 9,771,873 B2
(45) Date of Patent: Sep. 26, 2017

(54) BIFURCATION FAIRING

(71) Applicant: ROLLS-ROYCE PLC, London (GB)

(72) Inventors: Peter Beecroft, Derby (GB); Richard Geoffrey Stretton, Ashby-de-la-Zouch (GB); Philip Geoffrey Woodrow, Derby (GB); Stephane Michel Marcel Baralon, Derby (GB); Angus Roy Smith, Derby (GB)

(73) Assignee: ROLLS-ROYCE plc, London (GB)

( * ) Notice: Subject to any disclaimer, the term of this patent is extended or adjusted under 35 U.S.C. 154(b) by 264 days.

(21) Appl. No.: 14/705,550

(22) Filed: May 6, 2015

(65) Prior Publication Data

US 2015/0330236 A1    Nov. 19, 2015

(30) Foreign Application Priority Data

May 13, 2014  (GB) .................................. 1408415.6

(51) Int. Cl.
*F02C 9/18* (2006.01)
*F02K 3/06* (2006.01)
(Continued)

(52) U.S. Cl.
CPC ................ *F02C 9/18* (2013.01); *F01D 9/02* (2013.01); *F01D 9/065* (2013.01); *F01D 25/24* (2013.01);
(Continued)

(58) Field of Classification Search
CPC .. F01D 17/12; F01D 9/065; F02C 7/14; F02C 7/141; F02C 7/18; F02C 7/185; F02K 3/115; F02K 1/165
See application file for complete search history.

(56) References Cited

U.S. PATENT DOCUMENTS 4,196,856 A * 4/1980 James .................... F02K 1/1223
                                              239/265.39
5,123,242 A * 6/1992 Miller ....................... F02C 7/14
                                                    165/300
(Continued)

FOREIGN PATENT DOCUMENTS

EP      0 469 827 A1    2/1992
EP      1 574 668 A2    9/2005
(Continued)

OTHER PUBLICATIONS

Nov. 25, 2014 Search Report issued in British Application No. 1408415.6.

(Continued)

*Primary Examiner* — Woody Lee, Jr.
*Assistant Examiner* — Topaz L Elliott
(74) *Attorney, Agent, or Firm* — Oliff PLC

(57) ABSTRACT

A gas turbine engine including an outlet guide vane and a bifurcation fairing is disclosed. The outlet guide vane is located in a bypass duct of the gas turbine engine downstream of a fan and is of aerofoil form. The bifurcation fairing traverses the radial extent of the bypass duct and has an upstream end that blends into a trailing edge of the outlet guide vane. The bifurcation fairing includes a scoop protruding outwards from its side corresponding to a pressure side of the upstream outlet guide vane. The scoop includes a forward facing inlet leading to a delivery conduit extending inside the bifurcation fairing for delivery in use of bypass air to one or more components of the gas turbine engine.

12 Claims, 3 Drawing Sheets

(51) Int. Cl.
*F02K 3/115* (2006.01)
*F02C 7/18* (2006.01)
*F02C 7/14* (2006.01)
*F01D 9/06* (2006.01)
*F01D 9/02* (2006.01)
*F01D 25/24* (2006.01)
*F02C 6/08* (2006.01)

(52) U.S. Cl.
CPC .................. *F02C 6/08* (2013.01); *F02C 7/14* (2013.01); *F02C 7/18* (2013.01); *F02C 7/185* (2013.01); *F02K 3/06* (2013.01); *F02K 3/115* (2013.01); *Y02T 50/675* (2013.01)

(56) References Cited

U.S. PATENT DOCUMENTS

| | | | | |
|---|---|---|---|---|
| 5,203,163 | A | | 4/1993 | Parsons |
| 5,729,969 | A | * | 3/1998 | Porte .......... F02C 6/08 60/226.1 |
| 7,607,308 | B2 | * | 10/2009 | Kraft .......... F02C 6/08 60/226.1 |
| 7,966,831 | B2 | * | 6/2011 | Kraft .......... F02C 6/08 60/226.1 |
| 8,425,283 | B2 | * | 4/2013 | Porte .......... B64D 33/08 454/73 |
| 9,617,865 | B2 | * | 4/2017 | Zotz .......... F01D 11/00 |
| 2008/0028763 | A1 | | 2/2008 | Schwarz et al. |
| 2008/0230651 | A1 | | 9/2008 | Porte |
| 2009/0288387 | A1 | | 11/2009 | Baltas |
| 2009/0317238 | A1 | | 12/2009 | Wood et al. |
| 2012/0102915 | A1 | | 5/2012 | Baltas |
| 2012/0272658 | A1 | | 11/2012 | Murphy |
| 2014/0209286 | A1 | * | 7/2014 | Freund .......... F01D 9/065 165/168 |
| 2015/0113999 | A1 | * | 4/2015 | Tretow .......... B64D 13/06 60/782 |

FOREIGN PATENT DOCUMENTS

| | | |
|---|---|---|
| EP | 2 031 213 A2 | 3/2009 |
| EP | 2 604 837 A2 | 6/2013 |
| GB | 2 437 377 A | 10/2007 |
| WO | 2014/055152 A2 | 4/2014 |

OTHER PUBLICATIONS

U.S. Appl. No. 14/695,918, filed Apr. 24, 2015 in the name of Bagnall.
Oct. 9, 2015 Search Report issued in European Patent Application No. 15 16 6493.
Oct. 6, 2015 Search Report issued in European Patent Application No. 15164984.

* cited by examiner

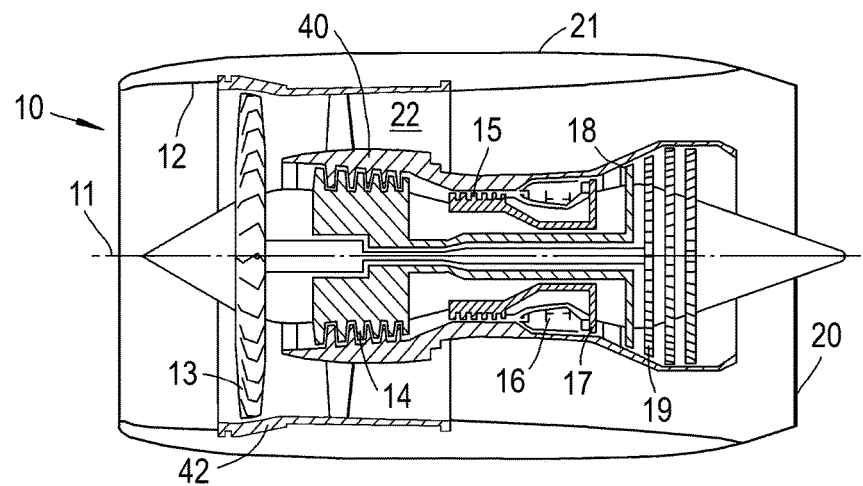
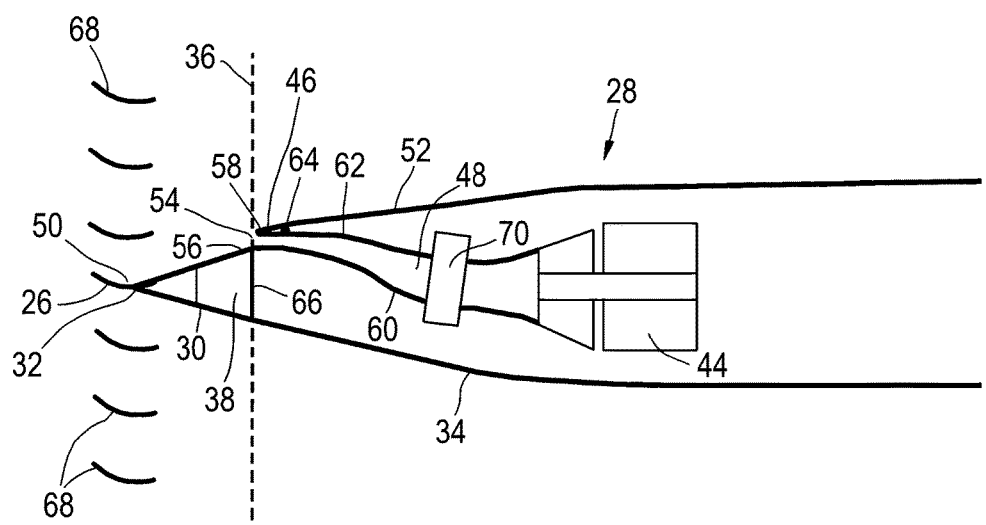

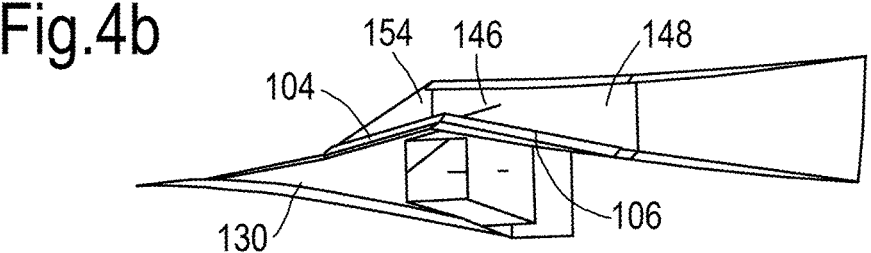
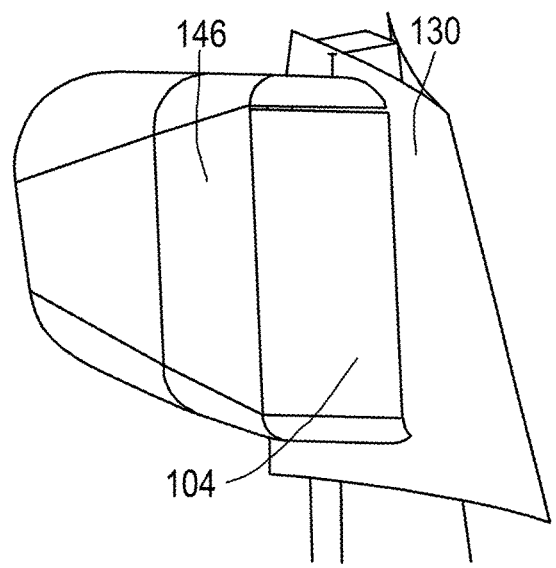
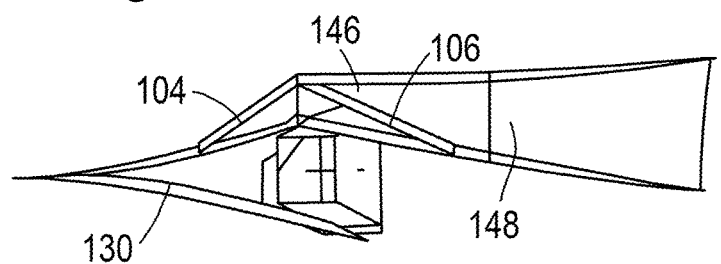

BIFURCATION FAIRING

The present disclosure concerns a gas turbine engine. More specifically the disclosure concerns bypass duct air inlets through bifurcation fairings. The disclosure may have particular application in the delivery of bypass duct cooling air to a pre-cooler for use in cooling hotter, higher pressure compressor bleed air, but is not limited to such applications.

In turbofan gas turbine engines there is a need to allow various conduits and/or cables to cross a bypass duct of the gas turbine engine in order that services can reach the core. These conduits and cables are typically housed in a bifurcation fairing, which provides protection for the components and an aerodynamic profile to reduce drag in the bypass duct. The bifurcation fairing traverses the radial extent of the bypass duct and is typically positioned nearby and downstream of an array of outlet guide vanes, which are themselves downstream of a fan of the gas turbine engine. The bifurcation fairing typically has a bifurcation splitter nose at its upstream end which widens into a bifurcation main body extending downstream. The bifurcation fairing can be further used to enclose engine mounts and pylon structure used to support the engine with respect to an aircraft.

It is further known to provide an inlet through the wall of the bifurcation fairing to allow collection of bypass duct air. Often such air is delivered, via a delivery conduit, to a heat exchanger located within the bifurcation fairing. The heat exchanger is typically used as part of the aircraft environmental control system, designed to deliver compressor bleed air to the cabin at a conditioned temperature, pressure and flow for the passengers. The compressor bleed temperature down-stream of the heat exchanger is controlled during the flight phase, with the desired temperature typically being achieved via controlled heat exchange with bypass duct air supplied through the delivery conduit.

From the point of view of the properties of the bypass duct air collected, it is often desirable that the inlet should be as close to the outlet guide vanes as possible. This tends to lead to collection of air that is at the highest available pressure and lowest speed. Typically therefore the inlet may be provided in the leading edge of the splitter nose.

With some engine designs, especially where the outlet guide vanes are proximate the rear of a fan case, it may be desirable to locate a structural bifurcation stiffener or structural outlet guide vane traversing the radial extent of the bypass duct within the splitter nose of the bifurcation fairing. Such a bifurcation stiffener or structural outlet guide vane may foul the desired path of an inlet located within a leading edge of the splitter nose. Further an inlet through a side wall of the bifurcation fairing may produce insufficient flow at insufficient pressure. This problem may be exacerbated with the drive for ever larger fans producing bypass air at ever lower pressures.

One proposed solution to this problem is to attempt to integrate the splitter nose with a structural outlet guide vane and provide the inlet at the leading edge of the outlet guide vane. This is however aerodynamically and structurally difficult to accomplish satisfactorily.

A further related problem concerns the desire to selectively reduce or prevent collection of bypass flow, which may be desirable within particular engine operating regimes. If, as is typical, collection is reduced or prevented by a valve in the delivery conduit, it typically causes a disadvantageous change in the upstream pressure field, negatively impacting on bypass duct flow past the outlet guide vanes. This problem may be exacerbated the nearer the inlet is to the outlet guide vanes (which, as described previously, may nonetheless be desirable for other reasons).

According to a first aspect of the invention, there is provided a gas turbine engine comprising optionally an outlet guide vane and optionally a bifurcation fairing, where the outlet guide vane is optionally located in a bypass duct of the gas turbine engine optionally downstream of a fan and is optionally of aerofoil form, and where the bifurcation fairing optionally traverses the radial extent of the bypass duct and optionally has an upstream end that blends into a trailing edge of the outlet guide vane, and where further the bifurcation fairing optionally comprises a scoop optionally protruding outwards from its side corresponding to a pressure side of the upstream outlet guide vane, the scoop optionally comprising an optionally forward facing inlet optionally leading to a delivery conduit optionally extending inside the bifurcation fairing optionally for delivery in use of bypass air to one or more components of the gas turbine engine.

The combination of a forward facing projecting scoop and the provision of that scoop downstream of the pressure side of the upstream outlet guide vane, may mean that more higher pressure air can be collected from the bypass duct than would otherwise be possible. This may negate the need for the inlet to be located in a leading edge of the bifurcation fairing, even where a particular volume of air collected at or above a particular pressure is required.

In some embodiment the outlet guide vane is the same as any one, a plurality or all of a plurality of additional outlet guide vanes disposed in the bypass duct, with the exception of the blend between the trailing edge of the guide vane and the bifurcation fairing. Further the outlet guide vane may be oriented so that it conforms to an orientation pattern of the plurality of additional outlet guide vanes. As will be appreciated the present invention may allow for the outlet guide vanes to be substantively unaltered in accommodating the inlet. This may allow the outlet guide vanes to offer improved aerodynamic performance by comparison with prior art systems requiring one or more modified outlet guide vanes.

In some embodiments the bifurcation fairing comprises a bifurcation splitter nose and a bifurcation fairing main body downstream of the splitter nose, wherein the splitter nose blends with the outlet guide vane trailing edge and increases in circumferential width from the outlet guide vane towards the main body so as to reduce the aerodynamic impact of the main body which is circumferentially wider than the outlet guide vane.

In some embodiments the splitter nose is in an axial segment of the gas turbine engine defined by an engine rear fancase, and the main body is in an axial segment of the gas turbine engine defined by a thrust reverse unit.

In some embodiments the splitter nose and main body are separate aligned parts.

In some embodiments the inlet of the scoop is provided between a downstream end of the splitter nose and an upstream end of the main body.

In some embodiments the delivery conduit passes through an aperture between the downstream end of the splitter nose and the main body and defines the inlet of the scoop.

In some embodiments a bifurcation stiffener is disposed inside the splitter nose, the bifurcation stiffener extending and providing structural support between a core casing of the gas turbine and a fan case of the gas turbine engine. This may reduce the need for additional structural supports, which may allow for a shorter fan-case.

In some embodiments the inlet of the scoop is aligned with or forward of a rear portion of the bifurcation stiffener. Positioning the inlet within this region may mean that it is suitably positioned to collect the peak pressure bypass duct air.

In some embodiments a seal is provided between the main body and the delivery conduit. This may facilitate the provision of a smooth flow path within the delivery conduit towards the one or more components of the gas turbine engine.

In some embodiments a valve is provided arranged to allow selective, at least partial, closing of the delivery conduit. Particularly in certain engine operating regimes the bypass duct air collected may no longer be required or may only be required in reduced quantities. Collecting excess air in these circumstances may lead to unnecessary losses of bypass duct air pressure and reduced efficiency.

In some embodiments the valve is located at the inlet of the scoop.

In some embodiments the valve comprises a deployable ramp arranged in a deployed configuration to aerodynamically mask the inlet of the scoop. Aerodynamically masking the inlet may allow closing of the valve without creating an unacceptable level of back pressure. This may allow positioning of the inlet further upstream and/or nearer the peak pressure without producing an unacceptable upstream pressure field adversely affecting air flow around the outlet guide vanes. Aerodynamically masking the inlet to close the valve may also reduce undesirable spillage around the inlet which would otherwise cause additional bypass duct losses.

In some embodiments the ramp may be partially deployable to any number of intermediate positions to allow for various degrees of inlet masking. This may allow additional degrees of modulation of the flow to the one or more components of the gas turbine engine.

In some embodiments the ramp, when in the deployed configuration, forms a substantially continuous surface with an outer wall of the delivery conduit and/or the main body of the bifurcation fairing. This may provide the minimum aerodynamic impediment necessary.

In some embodiments the ramp comprises at least one pair of plates hingedly connected at opposed edges, where when the ramp is in a stowed configuration a first of the plates lays substantially flat against the splitter nose and a second of the plates lays substantially flat against an inner wall of the delivery conduit, and where when the ramp is in a deployed configuration the opposed edges are raised away from the splitter nose and inner wall and the plates rotated about the hinged connection so that the inlet of the scoop is masked. The ramp may therefore be thought of as increasing the gradient of a side wall of the splitter nose up to the main portion and or scoop inlet, so as it masks the inlet, whilst maintaining a smooth aerodynamic surface. The second plate may mean that in any partial deployment state a well-defined inlet remains present, with a smooth transition into the remainder of the delivery duct.

In alternative embodiments the ramp comprises an inflatable body, where when the ramp is in a stowed configuration the body is deflated and lies substantially flat against the splitter nose and/or an inner wall of the conduit, and where when the ramp is in a deployed configuration the body is inflated, creating a ramp raised away from the splitter nose and/or inner wall which masks the inlet of the scoop.

In some embodiments at least one of the components is a pre-cooler or heat exchanger located inside the bifurcation fairing. The pre-cooler or heat exchanger may be arranged to provide heat exchange between bypass air delivered via the delivery conduit and another fluid or component. An exemplary other fluid might be air bled from a compressor of the gas turbine engine.

In some embodiments the delivery conduit follows a substantially straight path from the scoop to the pre-cooler or heat exchanger. This may mean that bypass duct air travels through the diffuser along a non-convoluted path. This may reduce pressure losses and improve the flow uniformity of the air as it enters the pre-cooler or heat exchanger, potentially improving cooling and reducing the occurrence of hot-spots.

In some embodiments the delivery conduit is a diffuser, having an expanding cross-section in the downstream direction. The present invention may be particularly advantageous where a diffuser is required. The ingestion of higher pressure lower speed air may reduce required performance of the diffuser.

The skilled person will appreciate that a feature described in relation to any one of the above aspects of the invention may be applied mutatis mutandis to any other aspect of the invention.

Embodiments of the invention will now be described by way of example only, with reference to the Figures, in which:

FIG. 1 is a sectional side view of a gas turbine engine;

FIG. 2 is a schematic top view of part of a gas turbine engine according to an embodiment of the invention;

FIG. 4b is a top view of the embodiment of FIG. 4a;

FIG. 5a is a perspective view of an embodiment of the invention with deployed ramp;

FIG. 5b is a top view of the embodiment of FIG. 5a.

Figure 3:
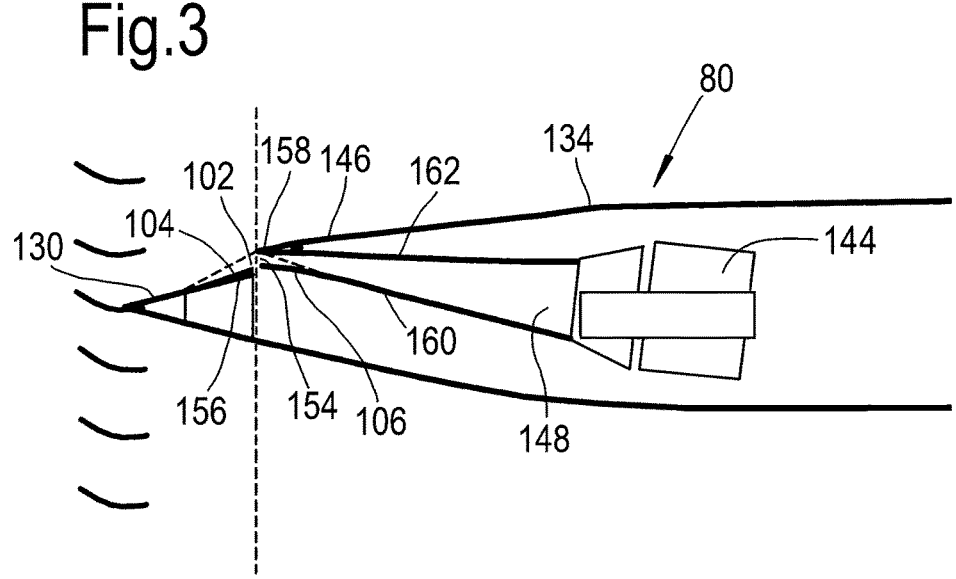
FIG. 3 is a schematic top view of part of a gas turbine engine according to an embodiment of the invention.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, intermediate pressure turbine 18, a low-pressure turbine 19 and an exhaust nozzle 20. A nacelle 21 generally surrounds the engine 10 and defines both the intake 12 and the exhaust nozzle 20. The core of the engine 10, containing the intermediate pressure compressor 14, high-pressure compressor 15, combustion equipment 16, high-pressure turbine 17, intermediate pressure turbine 18 and low-pressure turbine 19 is surrounded by a core casing 40.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

The second air flow produced by the fan 13 which passes through the bypass duct 22 flows past an annular array of outlet guide vanes 24, before continuing downstream through the bypass duct 22. The outlet guide vanes reduce the swirl of the second flow as it travels down the bypass duct as well as transferring load from a fan case 42 to the core casing 40.

Referring now to FIG. 2 a schematic top view of part of the bypass duct 22 is shown. Extending within the bypass duct 22, downstream of an outlet guide vane 26, is a bifurcation fairing generally shown at 28. The bifurcation fairing 28 traverses the radial extent of the bypass duct 22, providing an aerodynamic housing for an array of conduits (not shown) and cables (not shown) crossing the bypass duct 22. The bifurcation fairing 28 has at its upstream end a bifurcation splitter nose 30 which blends into a trailing edge 32 of the outlet guide vane 26. The splitter nose 30 is wedge shaped, increasing in circumferential width from the outlet guide vane 26 towards a bifurcation fairing main body 34 downstream of the splitter nose 30. The main body 34 continues the increase in circumferential width in the downstream direction introduced by the splitter nose 30 until it ultimately maintains a substantially consistent circumferential width.

The splitter nose 30 and main body 34 are separate components in that the splitter nose 30 forms part of a rear fancase, while the main body 34 forms part of a nacelle thrust reverser unit. During assembly the rear fancase and nacelle thrust reverser unit would be brought together to form the gas turbine engine 10, with the splitter nose 30 and main body 34 also being consequently brought together and aligned. In this embodiment the splitter nose 30 is contained within an axial segment of the gas turbine engine defined by the rear fancase and the main body 34 is in an axial segment of the gas turbine engine defined by the thrust reverse unit. The rear fancase is upstream of a plane 36 and the thrust reverse unit is downstream of the plane 36.

Contained within the splitter nose 30 is a bifurcation stiffener 38. The bifurcation stiffener extends and provides structural support between the core casing 40 of the gas turbine 10 and a fan case 42 of the gas turbine engine 10. The bifurcation stiffener 38 crosses the bypass duct 22 in a substantially radial direction, but is aerodynamically masked by the splitter nose 30.

Provided inside the main body 34 of the bifurcation fairing 28 is a component of the gas turbine engine, specifically a pre-cooler 44, arranged to receive a supply of air from the bypass duct 22. Bypass duct air is supplied to the pre-cooler 44 from a scoop 46 in the bypass duct 22 via a delivery conduit, in this case a diffuser 48. The diffuser 48 extends inside the bifurcation fairing 28 between the scoop 46 and pre-cooler 44, increasing in cross-sectional area in the downstream direction.

The scoop 46 protrudes outwards from a side of the bifurcation fairing 28 corresponding to a pressure side 50 of the upstream outlet guide vane 26. In this embodiment a side wall 52 of the main body 34 is deflected outwards to provide the scoop 46 and accommodate an upstream end of the diffuser 48 in providing a forward facing inlet 54. In this embodiment the inlet 54 is provided between a downstream end 56 of the splitter nose 30 and an upstream end 58 of the main body 34, the side wall 52 of the latter being deflected outwards to produce a gap between the splitter nose 30 and the main body 34. An inner wall 60 of the diffuser 48 forms a continuous surface with the splitter nose 30 and an outer wall 62 of the diffuser 48 abuts the upstream end 58 of the main body 34. A seal 64 is provided between the outer wall 62 of the diffuser 48 and the upstream end 58 of the main body 34. As will be appreciated, in alternative embodiments, the scoop 46 may be defined in an alternative manner. By way of example the side wall 52 of the main body 34 may not be deflected outwards in order to define the scoop 46, but instead may leave an axial aperture to the splitter nose 30, through which the diffuser 48 extends and defines the inlet of the scoop 46. Beyond the aperture, the diffuser 48 might extend forward adjacent the splitter nose 30, defining the inlet 54 further upstream.

Returning to the present embodiment, the inlet 54 of the scoop 46 is substantially axially aligned with a rear portion 66 of the bifurcation stiffener 38. The inlet 54 is also proximate the peak pressure produced in the bypass duct air by the pressure side 50 of the outlet guide vane 26. Indeed in some embodiments the location of the inlet 54 is selected to substantially coincide with the peak pressure produced by the pressure side 50 of the outlet guide vane 26.

In use, air driven into the bypass duct 22 by the fan 13 passes the array of outlet guide vanes 24, consisting of the outlet guide vane 26 and additional outlet guide vanes 68. As air passes the pressure side 50 of the outlet guide vane 26, its pressure is increased and its speed reduced. That air tends to be turned by the splitter nose 30 and travels alongside it. A proportion of the air is captured by the scoop 46, entering the inlet 54 and travelling along the diffuser 48. As the air travels along the diffuser 48 its pressure is reduced as the cross-sectional area increases. In the pre-cooler 44 the relatively low pressure, low temperature air supplied via the diffuser 48 is used to cool relatively high pressure, high temperature air supplied to the pre-cooler 44 from a compressor bleed (not shown) of the gas turbine engine 10. Once cooled in a heat exchanger of the pre-cooler 44, the relatively high pressure compressor bleed air is transported to the cabin of an aircraft with which the gas turbine engine 10 is associated. In alternative embodiments however the air could for example be used to cool engine oil in an engine oil heat exchanger, to provide cooled cooling air and/or case cooling.

When operation of the pre-cooler 44 is not required, or reduced capacity operation of the pre-cooler 44 is sufficient (as may be the case in certain engine 10 operating regimes), a valve 70 in the diffuser 48 may be actuated to restrict or prevent the supply of bypass duct air to the pre-cooler 44. While operation of valve 70 may prevent unnecessary losses of bypass duct 22 pressure, partial or complete closing of the valve 70 may cause a change in the pressure field to occur upstream of the inlet 54, potentially disadvantageously affecting flow around the outlet guide vanes 24.

Figure 4A:
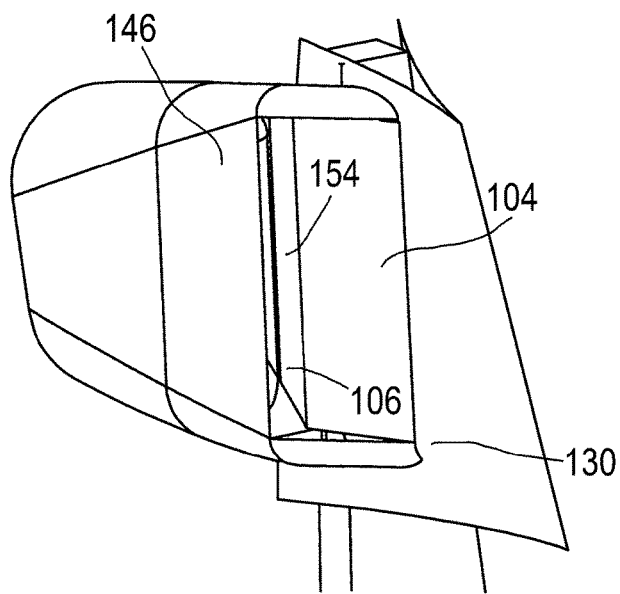
FIG. 4a is perspective view of an embodiment of the invention with stowed ramp.

Reference is now made to FIGS. 3, 4 and 5 in which features common with those of FIG. 2 are assigned like reference numerals in the series 100.

FIG. 3 shows a bifurcation fairing 80. The principal difference between the bifurcation fairings 28 and 80 is that bifurcation fairing 80 has a valve 102 located at the inlet 154 of the scoop 146, rather than downstream of the inlet 154 in the diffuser 148. The valve 102 is a deployable ramp having a pair of plates, a first plate 104 shown lying flat against the splitter nose 130 and a second plate 106 shown lying flat against the inner wall 160 of the diffuser 148. The first 104 and second 106 plates are hingedly connected along their adjacent sides. The hinged connection between the first 104 and second 106 plates is aligned with the inlet 154 and in this case specifically with the downstream end 156 of the splitter nose 130 and upstream end 158 of the main body 134.

When in use the valve 102 is actuatable between a stowed configuration (best illustrated in FIGS. 4a and 4b) and a deployed configuration (best illustrated in FIG. 5). The valve 102 may also be actuated to any number of partially deployed configurations, intermediate the stowed and deployed configurations shown. When the valve 102 is actuated away from its stowed configuration, the adjacent sides (opposed edges) of the plates 104, 106 are raised away from the splitter nose 130 and inner wall 160, and the plates 104, 106 are rotated about the hinged connection. This gives rise to a ramp with its apex corresponding to the position of the adjacent sides of the plates 104, 106 and the plates 104, 106 extending back to the splitter nose 130 and inner wall 160. This gives rise to at least partial closing and aerodynamic masking of the inlet 154.

In the deployed configuration aerodynamic masking arises because the first plate 104 creates a ramp between the splitter nose 130 and the main body 134 and/or outer wall 162 of the diffuser 148 that covers the inlet 154. The ramp is sufficiently shallow such that there is no significant change in surface curvature across the inlet 154 from the splitter nose 130 and into the main body 134 or diffuser 148 outer wall 162. In the present embodiment, the first plate extends for approximately half the length of the splitter nose 130 when in the deployed configuration. In other embodiments it may extend for at least a quarter of the length of the splitter nose 130. As will be appreciated, actuation to a partially deployed configuration will give a degree of closing and aerodynamic masking of the inlet 154.

The aerodynamic masking provided by the valve 102 may reduce or prevent the formation of a disadvantageous variation in the pressure field upstream of the inlet 154 that might otherwise arise as a result of diffuser 148 closure or partial closure.

The second plate 106 may ensure that in any partial deployment state, a well-defined inlet remains present, with a smooth transition into the remainder of the diffuser 148.

A further distinction between the bifurcation fairing 80 and the bifurcation fairing 28 is that the diffuser 148 follows a substantially straight path from the scoop 146 to the pre-cooler 144. This reduces pressure losses and improves the flow uniformity of the air as it enters the pre-cooler 144, improving cooling and reducing the occurrence of hot-spots.

It will be understood that the invention is not limited to the embodiments above-described and various modifications and improvements can be made without departing from the various concepts described herein. Except where mutually exclusive, any of the features may be employed separately or in combination with any other features and the invention extends to and includes all combinations and sub-combinations of one or more features described herein in any form of gas turbine engine.

The invention claimed is:

1. A gas turbine engine comprising an outlet guide vane and a bifurcation fairing, where the outlet guide vane is located in a bypass duct of the gas turbine engine downstream of a fan and is of aerofoil form, and where the bifurcation fairing traverses the radial extent of the bypass duct and has an upstream end that blends into a trailing edge of the outlet guide vane, and where further the bifurcation fairing comprises a scoop protruding outwards from its side corresponding to a pressure side of the upstream outlet guide vane, the scoop comprising a forward facing inlet leading to a delivery conduit extending inside the bifurcation fairing for delivery in use of bypass air to one or more components of the gas turbine engine.

2. A gas turbine engine according to claim 1 where the bifurcation fairing comprises a bifurcation splitter nose and a bifurcation fairing main body downstream of the splitter nose, wherein the splitter nose blends with the outlet guide vane trailing edge and increases in circumferential width from the outlet guide vane towards the main body so as to reduce the aerodynamic impact of the main body which is circumferentially wider than the outlet guide vane.

3. A gas turbine engine according to claim 2 where the inlet of the scoop is provided between a downstream end of the splitter nose and an upstream end of the main body.

4. A gas turbine engine according to claim 2 where the delivery conduit passes through an aperture between the downstream end of the splitter nose and the main body and defines the inlet of the scoop.

5. A gas turbine engine according to claim 2 where a bifurcation stiffener is disposed inside the splitter nose, the bifurcation stiffener extending and providing structural support between a core casing of the gas turbine and a fan case of the gas turbine engine.

6. A gas turbine engine according to claim 5 where the inlet of the scoop is aligned with or forward of a rear portion of the bifurcation stiffener.

7. A gas turbine engine according to claim 1 where a valve is provided arranged to allow selective, at least partial, closing of the delivery conduit.

8. A gas turbine engine according to claim 7 where the valve comprises a deployable ramp arranged in a deployed configuration to aerodynamically mask the inlet of the scoop.

9. A gas turbine engine according to claim 8 where the bifurcation fairing comprises a bifurcation splitter nose and a bifurcation fairing main body downstream of the splitter nose, wherein the splitter nose blends with the outlet guide vane trailing edge and increases in circumferential width from the outlet guide vane towards the main body so as to reduce the aerodynamic impact of the main body which is circumferentially wider than the outlet guide vane, where the ramp comprises at least one pair of plates hingedly connected at opposed edges, where when the ramp is in a stowed configuration a first of the plates lays substantially flat against the splitter nose and a second of the plates lays substantially flat against an inner wall of the delivery conduit, and where when the ramp is in a deployed configuration the opposed edges are raised away from the splitter nose and inner wall and the plates rotated about the hinged connection so that the inlet of the scoop is masked.

10. A gas turbine engine according to claim 1 where at least one of the components is a pre-cooler or heat exchanger located inside the bifurcation fairing.

11. A gas turbine engine according to claim 10 where the delivery conduit follows a substantially straight path from the scoop to the pre-cooler or heat exchanger.

12. A gas turbine engine according to claim 10 where the delivery conduit is a diffuser, having an expanding cross-section in the downstream direction.

* * * * *